United States Patent [19]

Bauer et al.

[11] Patent Number: 5,199,800
[45] Date of Patent: Apr. 6, 1993

[54] BEARING BUSHING FOR UNIVERSAL JOINTS

[75] Inventors: Bernard Bauer, Hassfurt; Werner Jacob, Frankfurt; Martin Schepp, Schweinfurt, all of Fed. Rep. of Germany

[73] Assignee: SKF GmbH, Schweinfurt, Fed. Rep. of Germany

[21] Appl. No.: 777,602

[22] Filed: Oct. 15, 1991

[30] Foreign Application Priority Data

Oct. 17, 1990 [DE] Fed. Rep. of Germany ... 9014393[U]

[51] Int. Cl.⁵ .............................................. F16C 33/58
[52] U.S. Cl. .................................... 384/473; 384/569; 384/905.1
[58] Field of Search ..................... 384/473, 905.1, 569, 384/564, 452, 455

[56] References Cited

U.S. PATENT DOCUMENTS

| | | | |
|---|---|---|---|
| 4,325,593 | 4/1982 | Mallet | 384/905.1 |
| 4,478,066 | 10/1984 | Olschewski et al. | 384/569 |
| 4,522,514 | 6/1985 | Olschewski et al. | 384/905.1 |
| 4,553,858 | 11/1985 | Neugebauer et al. | 384/905.1 |

Primary Examiner—Lenard A. Footland
Attorney, Agent, or Firm—Eugene E. Renz, Jr.

[57] ABSTRACT

Bearing bushing for universal joints, made of thin plate and consisting of a cylindrical sleeve and a bottom wall formed internally with the sleeve. The bottom of the bearing bushing is flat near its outer edge and is provided with several stamped areas distributed around the periphery to form crimps. The lateral surfaces of these crimps 17 preferably forming an acute angle alpha. The diameter D of the circle surrounding the outer surfaces is approximately equal to the diameter D of the lateral surface of the cylindrical sleeve. The juncture between the base surfaces of the crimps and the cylindrical sleeve 19 has a relatively large radius.

6 Claims, 2 Drawing Sheets

BEARING BUSHING FOR UNIVERSAL JOINTS

FIELD OF THE INVENTION

The present invention relates to improvements in bearing bushings for universal joints.

BACKGROUND OF THE INVENTION

Bearing bushings are usually made of thin plate and consist generally of a cylindrical sleeve and a bottom formed integrally to form a single piece with the sleeve. They are usually stiffened by several crimps distributed around the periphery of the bearing bushing. Bearing bushings of this general configuration are not new per se. For example, West Germany Registered Design No. 1,874,295 discloses a bushing having a bottom which is flat in the central zone and has an outer conically shaped section which continues by way of a turned up edge into the cylindrical part of the bearing bushing and which is crimped to stiffen it.

It has been found that this design has several disadvantages and drawbacks. For example, it has been found that cracks or fissures form in the transition zone between the bottom of the bushing and the cylindrical sleeve which result from powerful forces acting on the bottom. These cracks or fissures can lead ultimately to failure of the bearing bushing. Additionally, the sleeve in this known design is relatively long because of the conically shaped section.

SUMMARY OF THE INVENTION

With the foregoing in mind, it is an object of the present invention to provide an improved bearing bushing generally of the type described above which overcomes the disadvantages of the prior art and which is characterized by novel features of construction and arrangement providing a sturdy bottom capable of absorbing large axial forces and wherein the danger of cracks or fissures forming in the transition zone between the cylindrical sleeve and the bottom of the bearing bushing even under heavy loads is eliminated. To this end, and in accordance with the present invention, the bottom of the bearing bushing is flat in the area of the outer edge and is stamped to form crimps defining a series of points about the periphery so that the lateral surfaces of the crimps preferably form an acute angle, wherein the diameter of the circle defined by the outer surfaces is approximately the same as the diameter of the lateral surface of the cylindrical sleeve. Additionally, the bearing bushing of the present invention is characterized by a relatively large radius between the base surface of the crimps and the cylindrical sleeve. In this configuration, the bearing bushing is capable of withstanding stress for prolonged periods of time even when heavy forces are acting on the bottom of the bearing bushing.

In accordance with another feature of the present invention, a plurality of recesses are provided in the bottom of the bearing bushing which serve as grease reservoirs. The recesses are on the side facing the universal joint stud and preferably correspond in number to the number of stamped areas, so that both the sliding and rolling surfaces of the bearing are well lubricated during the lifetime of the bushing.

In accordance with still another more specific feature of the present invention, the bottom of the bearing bushing is provided with a concentric bulge which serves to further eliminate stress in the bottom part of the bearing bushing which may occur during the production process.

Still another feature of the present invention is the provision of a dimple concentric to the universal joint stud which has a contact surface for the stud. By this arrangement, the dimple, in conjunction with crimps in the bottom, forms a stable resting position for the universal joint stud.

In accordance with still another specific feature of the present invention, an inward recess is provided in the bearing bushing adjacent a concentric bore in the universal stud and several projections are distributed uniformly about the periphery which have dot-shaped contact surfaces for the universal joint stud.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
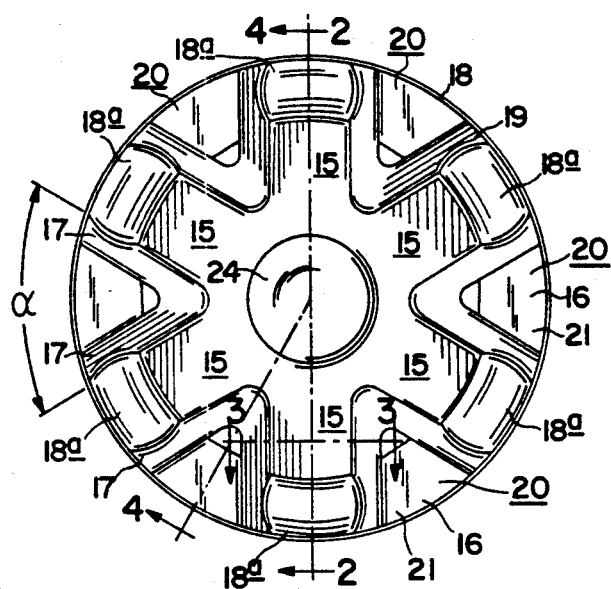
FIG. 1 is a bottom plan view of a bearing bushing in accordance with the present invention.

Referring now to the drawings and particularly to FIGS. 1–4 thereof, there is shown bearing generally designated by the letter B for a universal joint stud 1. The bearing consists of a thin-walled bearing bushing 2, a plurality of cylindrical rolling elements 3, a thrust washer 4 for the universal joint stud 1, and inner and outer sealing rings 5, 6 In the embodiment shown in FIG. 1, there is a full complement of rolling elements and they fill up all the available space and roll at one end over an elastic disk 7 which is supported on the bottom wall 8 of the bearing bushing and which presses the rolling elements 3 against a sheet metal cap 9. As illustrated, the sheet metal cap 9 circumscribes the inner sealing 5 and has an angled section 10 which engages in a ring-shaped groove 11 in the bearing bushing 2.

Figure 2:
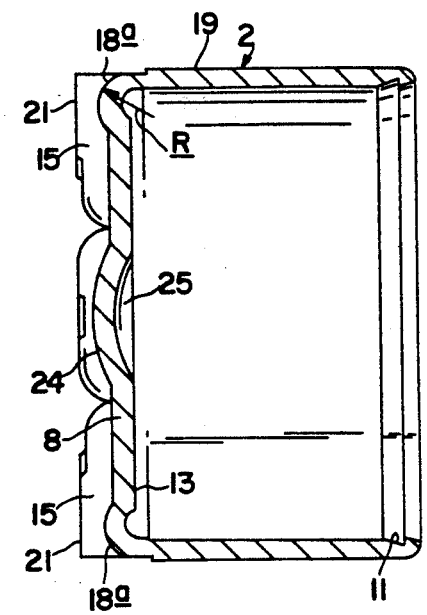
FIGS. 2 and 3 are sectional views taken along lines 2—2 and 3—3 of FIG. 1.
Figure 3:
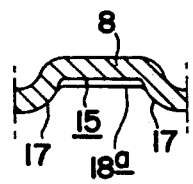

In accordance with an important feature of the present invention, the bottom wall 8 of the bearing bushing 2 shown in FIGS. 1–3 inclusive is stamped at several locations around the outer edge to form crimp areas 15 circumferentially spaced about the periphery having lateral surfaces 17 forming an acute angle alpha. The diameter D of the circle formed at the outer surfaces 18 of the crimps is preferably approximately the same as the diameter D' of the lateral surface of cylindrical sleeve 19.

As best illustrated in FIG. 2, the base surfaces 18A of the crimped zones 15 are defined at the transition area between the bottom wall 8 and cylindrical sleeve 19 of bearing bushing 2 with large radii R. By this configuration, these points, which are typically heavily stressed, do not develop hairline cracks which could lead to destruction of the bearing bushing 2.

Figure 4:
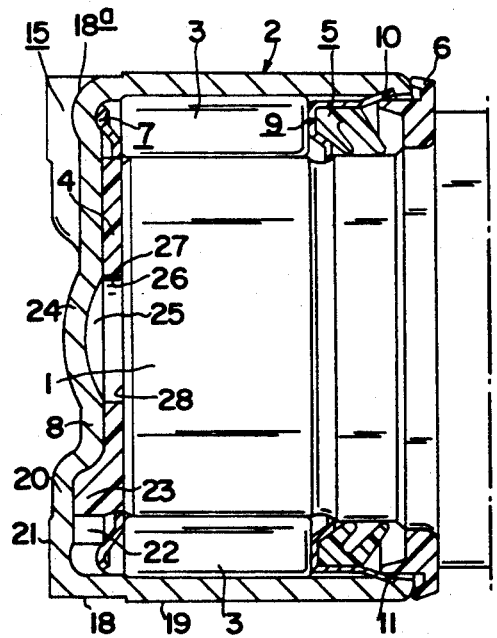
FIG. 4 is a sectional view taken along lines 4—4 of FIG. 1.

Cover part 20 of stamped area 16 defines a radially extending flat contact surface 21 which, after installation of the bearing bushing 2, defines a support surface against which a lock ring (not shown) rests. The crimps 15 define recesses 22 on the side of the bottom wall 8 facing toward the universal joint 1. These recesses function as lubricating reservoirs for lubrication of the rolling and sliding surfaces of the bearing bushing elements. As best illustrated in FIG. 4, thrust washer 4 for universal joint stud 1 has a projection 23 on the side facing the wall 8 which engages in recess 22 and thereby prevents thrust washer 4 from turning. The bottom wall 8 has a concentric protrusion or bulge 24 pointing outwardly to form a curved or arcuate recess 25. The convexity thus formed aids in eliminating stresses in the bottom part of the bushing which occur during production. Additionally, the arcuate recess 25 also functions as a lubricant reservoir wherein the lubricant is supplied to sliding surfaces 27, 28 through a concentric bore and thrust washer 4.

Figure 4A:
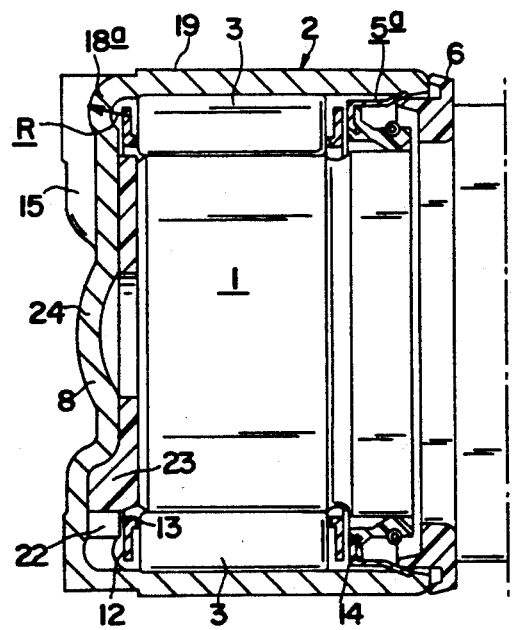
FIG. 4A is a transverse sectional view similar to FIG. 4 of a further embodiment of bearing bushing in accordance with the present invention.

The embodiment of the invention shown in FIG. 4A is generally similar to that described above in FIG. 1 except that the rolling elements 3 are supported in a cage 12 which is guided axially on a surface 13 of bottom wall 8 and on a support element 14 of a sealing ring 5a.

Figure 5:
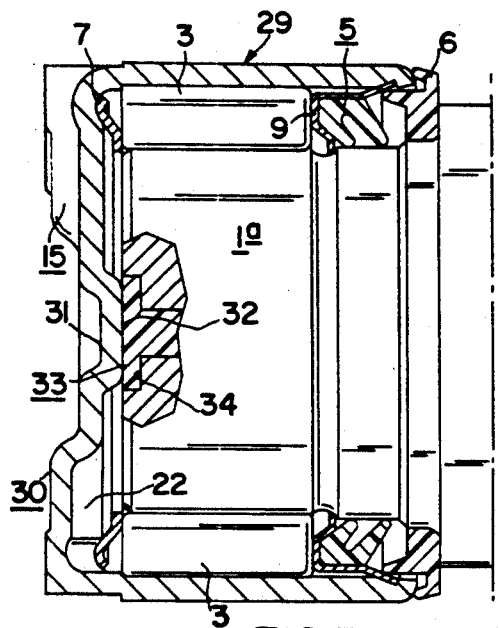
FIG. 5 is a transverse sectional view similar to FIGS. 2 and 4A of a still further modified form of a bearing bushing in accordance with the present invention.

There is illustrated in FIG. 5 a further embodiment of a bearing bushing constructed in accordance with the present invention generally designated by the numeral 29. The bearing bushing is generally similar in overall configuration to that described above and differs from the bearing bushing in the previous embodiments in that the bottom wall 30 has a concentric dimple 31 with a planar contact surface 32 for the universal joint stud 1. The dimple 31, in conjunction with the crimps 15 in the bottom wall 30, provides a stable resting position for the universal joint stud 1. Universal joint stud 1 is preferably provided with a plastic disk 33 of a material such as Teflon ™ having favorable sliding properties which as illustrated is mounted in a concentric recess 34 in the axially end face of the stud 1.

Figure 5A:
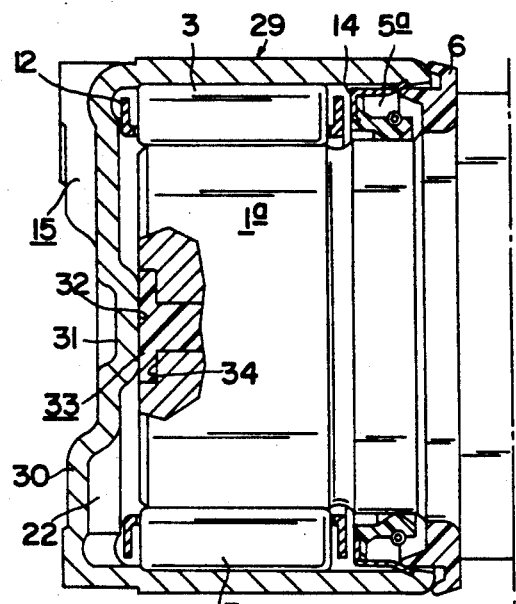
FIG. 5A is a transverse sectional view of a modification of the assembly shown in FIG. 5.

The embodiment shown in FIG. 5A is similar to FIG. 5 except that the rolling elements 3 are supported in a cage 12 which is guided axially on a surface of bottom wall 30 and on a support element 14 of a sealing ring 5a.

Figure 6:
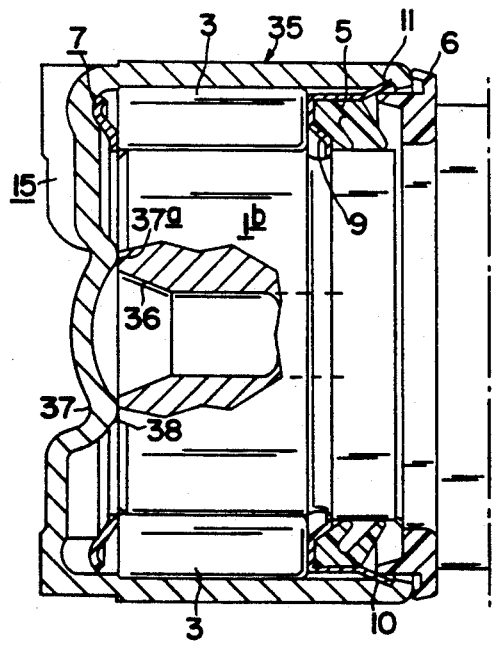
FIG. 6 is a transverse section view of a further embodiment of bearing bushing in accordance with the present invention.

There is shown in FIG. 6 a further modification of bearing bushing in accordance with the present invention generally designated by the numeral 35. This design is generally similar to that shown in FIG. 5 except in this instance, the stud has a concentric bore 36 having an outwardly flared terminal end portion, and the bearing bushing 35 has an inward recess 37 defining several projection 37a distributed about its periphery defining point-shaped contact surfaces 38 engaging the universal joint about the periphery of the flared portion of the opening 36.

Figure 6A:
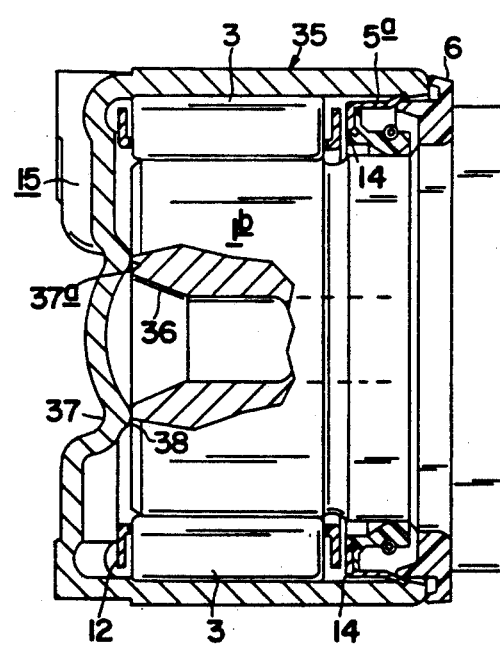
FIG. 6A is a modification of the assembly shown in FIG. 6.

The embodiment of the invention shown in FIG. 6A is generally similar to that described above in FIG. 6 except that the rolling elements 3 are supported in a cage 12 which is guided axially on a surface of bottom wall and on a support element 14 of a sealing ring 5a.

Even though particular embodiments of the invention have been illustrated and described herein, it is not intended to limit the invention and changes and modifications may be made therein within the scope of the following claims.

What is claimed is:

1. Bearing busing for universal joints, made of thin plate and consisting of a cylindrical sleeve and a bottom wall formed integrally with the sleeve, characterized in that the bottom (8, 30) of the bearing bushing (2, 29, 35) is flat near its outer edge and is provided with several stamped areas (16) distributed around the periphery to form crimps, the lateral surfaces of said crimps (17) forming an acute angle alpha, the diameter of the circle surrounding the outer surfaces (18) being approximately equal to the diameter of the lateral surface of the cylindrical sleeve (19), and the juncture between the base surfaces (18a) of the crimps (15) and the cylindrical sleeve (19) having a predetermined radius R whereby stress fractures are minimized at the base surfaces (18a) of the crimps (15) and the cylindrical sleeve (19).

2. Bearing bushing according to claim 1, characterized in that the stamped areas (16) each have has a cover part (20) with a flat contact surface (21).

3. Bearing bushing according to claim 1, characterized in that the bottom wall (8, 30) of the bushing has recesses (22) to serve as grease reservoirs on the side facing the universal joint (1), the number of reservoirs corresponding to the number of stamped areas (16).

4. Bearing bushing according to claim 1, characterized in that the bottom wall (8) of the bushing has a concentric bulge (24).

5. Bearing bushing according to claim 1, characterized in that the bottom wall (30) of the bushing has a dimple (31) concentric to the universal joint stud, said dimple having a contact surface.(32) for the universal joint stud (1).

6. Bearing bushing according to claim 1, characterized in that the bearing bushing (35) has an inward recess (37) near a concentric bore (36) in the universal joint stud (1) and several projections (37a) distributed uniformly around the periphery, said projections having dot-shaped contact surfaces (38) for the universal joint stud (1).

* * * * *